(12) United States Patent
Mendez (10) Patent No.: US 6,942,264 B1
(45) Date of Patent: Sep. 13, 2005

(54) DISPOSABLE PET WASTE RECEPTACLE

(76) Inventor: Richard Mendez, 95221 Waimaku Pl., Mililani, HI (US) 96789

( * ) Notice: Subject to any disclaimer, the term of this patent is extended or adjusted under 35 U.S.C. 154(b) by 110 days.

(21) Appl. No.: 10/361,937

(22) Filed: Feb. 10, 2003

(51) Int. Cl.$^7$ .............................................. A01K 29/00
(52) U.S. Cl. ..................................................... 294/1.5
(58) Field of Search ........................... 15/257.1, 257.3, 15/257.4, 257.7; 119/161, 867; 248/99, 101; 403/59, 62, 64, 65, 68; 294/1.3, 1.4, 1.5, 19.1

(56) References Cited

U.S. PATENT DOCUMENTS

| | | | | |
|---|---|---|---|---|
| 1,664,658 | A | * | 4/1928 | Blazer ......................... 248/94 |
| 2,421,740 | A | * | 6/1947 | Birch, Jr. .................... 248/101 |
| 2,462,973 | A | * | 3/1949 | Kelrick ....................... 248/101 |
| 3,139,299 | A | | 6/1964 | Bowem |
| 3,688,483 | A | * | 9/1972 | Hamilton .................... 294/1.4 |
| 3,872,831 | A | | 3/1975 | Cassidy |
| 3,937,509 | A | | 2/1976 | Hufnagel |
| 4,003,595 | A | * | 1/1977 | Fano et al. .................. 294/1.5 |
| 4,042,269 | A | | 8/1977 | Skermetta |
| 4,225,174 | A | | 9/1980 | Hennessy et al. |
| 4,236,741 | A | * | 12/1980 | Emme ......................... 294/1.5 |
| 4,262,948 | A | * | 4/1981 | Emme ......................... 294/1.5 |
| 4,555,132 | A | | 11/1985 | Takoushian |
| D290,416 | S | * | 6/1987 | Breuer ....................... D30/162 |
| 4,822,087 | A | * | 4/1989 | DeCarlo ...................... 294/1.1 |
| 4,852,924 | A | * | 8/1989 | Ines ........................... 294/1.5 |
| 4,958,871 | A | | 9/1990 | Hemans |
| 5,236,237 | A | | 8/1993 | Shultz |
| 5,335,952 | A | | 8/1994 | Clapper |
| 5,350,208 | A | | 9/1994 | Heinrichson |
| 5,628,537 | A | | 5/1997 | Kiemer |
| 5,683,129 | A | * | 11/1997 | Jensen ........................ 294/1.5 |
| 6,149,214 | A | * | 11/2000 | Kipka et al. ................. 294/1.5 |
| 6,305,322 | B1 | | 10/2001 | Patel |
| 6,702,349 | B2 | * | 3/2004 | Clements .................... 294/1.5 |

* cited by examiner

Primary Examiner—Paul T. Chin
(74) Attorney, Agent, or Firm—Michael I. Kroll (57) ABSTRACT

A disposable pet waste receptacle 22 uses a selectively telescoping handle 14 having a pivotal ring 20 with a disposable bag 22 fastened therearound. The bag 22 can be placed under the anus of an animal 16 during defecation relieving the owner 12 from having to pickup the fecal material after the fact. The telescoping handle 14 is preferably no more than 16" in length when fully retracted and does not exceed 36" in length when fully extended. The pivotal ring 20 includes a double lip 48, 50 providing support of the disposable receptacle 22. The disposable receptacle 22 contains an elastic band 52 that is nestled between the upper and lower lips 48, 50 of the ring 20. A tie string 54 is woven within the elastic band 52 to enable the user to close the receptacle 22 upon disposal. The handle 14 is attached to the double lip rim 20 with a pivoting joint device 24 with a self-locking mechanism such as a tension screw means which allows the user 12 to project the handle 14 in a desired angle. A quick-connect attachment may also be provided thereby allowing the user 12 to easily remove the double lip rim 20 from the handle 14 in one easy motion.

6 Claims, 12 Drawing Sheets

DISPOSABLE PET WASTE RECEPTACLE

BACKGROUND OF THE INVENTION

1. Field of the Invention

The present invention relates generally to sanitary receptacles, more specifically, to a disposable waste receptacle for canines and the like.

Fastidious waste clean up is essential to the good health of a pet and family. Disposal of pet stools regularly protect against disease-causing bacteria, hookworms, whipworms, and other organisms that could cause serious illness. In addition, your dog can spread or contract parvovirus or coronavirus through infected feces. All of these diseases are very serious and common.

Other important reasons to clean up pet waste include fly control, preventing stool eating, make a yard more useable, and responsible pet ownership. In fact, many city and state ordinances mandate feces removal on public and private properties.

The present invention is a disposable pet waste receptacle that provides means for dog owners to capture pet feces. The disposable pet waste receptacle uses a selectively telescoping handle having a pivotal ring with a disposable bag fastened therearound whereby the bag can be placed under the anus of the animal during defecation which relieves the owner from having to pickup the fecal material after the fact.

When the handle is extended, the user is enabled to scoop and reach the feces without bending or stretching. When the handle is retracted, the catcher is convenient to carry or store. The telescoping handle is preferably no more than 16" in length when fully retracted and does not exceed 36" in length when fully extended.

The pivotal ring includes a double lip providing support of the disposable receptacle. The disposable receptacle contains an elastic band that is nestled between the upper and lower lips of the ring. A tie string is woven within the elastic band to enable the user to close the receptacle upon disposal.

The handle is attached to the double lip rim with a pivoting joint with a self-locking mechanism such as a tension screw assembly. The double lip rim may be pivoted into a desired angle by applying enough pressure thereto in order to overcome the locking mechanism and rotating the double lip rim to the desired angle, at which time the selflocking mechanism will prevent the inadvertent rotation thereof. This allows the user to project the handle in a desired angle. A ring affixed to distal end of the handle opposite the receptacle, provides means for hanging the receptacle when not in use.

A quick-connect attachment may also be provided thereby allowing the user to easily remove the double lip rim from the handle in one easy motion.

2. Description of the Prior Art

There are other pet feces receptacle devices known in the art. Typical of these is U.S. Pat. No. 3,139,299 issued to J. B. Bowden on Jun. 30, 1964.

Another patent was issued to Andrew Cassidy on Mar. 25, 1975 as U.S. Pat. No. 3,872,831. Yet another U.S. Pat. No. 3,937,509 was issued to Frank W. Hufnagel on Feb. 10, 1976 and still yet another was issued on Aug. 16, 1977 to Geraldine J. Skermetta as U.S. Pat. No 4,042,269.

Another patent was issued to Michael P. Hennessy on Sep. 30, 1980 as U.S. Pat. No. 4,225,174. Yet another U.S. Pat. No. 4,555,132 was issued to John Takoushian on Nov. 26, 1985. Another was issued to James W. Hemans on Sep. 25, 1990 as U.S. Pat. No. 4,958,871 and still yet another was issued on Aug. 17, 1993 to Clair W. Shultz as U.S. Pat. No. 5,236,237.

Another patent was issued to Millard Clapper on Aug. 9, 1994 as U.S. Pat. No. 5,335,952. Yet another U.S. Pat. No. 5,350,208 was issued to Dante C. Heinrichson on Sep. 27,1994. Another was issued to Ralph F. Kiemer on May 13, 1997 as U.S. Pat. No. 5,628,537 and still yet another was issued on Oct. 23, 2001 to Tony Patel as U.S. Pat. No. 6,305,322.

U.S. Pat. No. 3,139,299

Inventor: J. B. Bowden

Issued: Jun. 30, 1964

This invention relates to refuse collection. The refuse collector of the present invention comprises two elongated main frames, which are arranged in longitudinal sliding relationship with one another. A bowl is carried at the lower end of one of the frames and a scoop is pivotally connected to both of the frames and is so arranged that when one of the frames is moved manually longitudinally relative to one another, the scoop pushes the refuse into the bowl.

U.S. Pat. No. 3,872,831

Inventor: Andrew Cassidy

Issued: Mar. 25, 1975

A portable sanitation for collecting fecal mater particularly from dogs, including a short annular member having an upstanding rim over which may be folded the outer edge portion of a disposable bag, the main part of which bag extends within the annular member, releasable clip means being provided for retaining the edge portion of the bag. The divide also includes a hinged lid which normally closes the top of the bag, and a long handle allowing a person standing upright to hold an annular member near the ground so that the bag is position to receive directly the stool of the dog. The bag protects the devise from any contact with the fecal matter, and may be released from the device and dropped into a garbage container without the bag being touched by the hand.

U.S. Pat. No. 3,937,509

Inventor: Frank W. Hufnagel

Issued: Feb. 10, 1976

An animal feces collecting device is used to scoop up animal feces from the ground or catch the feces as is falling from the animal. The animal feces device comprises an open top cylinder shape container having a communicating disposable plastic bag. A telescoping handle assembly is affixed to a longitudinal sidewall of the cylinder shaped container. A circular shape disc top cover is hingeably mounted to the open end of the cylinder shape container.

U.S. Pat. No. 4,042,269

Inventor: Geraldine J. Skermetta

Issued: Aug. 16, 1977

A portable toilet for pets consists of a container with a hinged top and bottom connected to a base structure. The hinged top and bottom are biased towards a closed position by a spring interconnected therebetween. A handle extends upwardly from the base structure with a handle grip located on the upper end thereof. Control buttons immediately below the handle grip are connected through wire lines to pivot the hinged top or the hinged bottom to an open position against the closing bias of the spring.

U.S. Pat. No. 4,225,174

Inventor: Michael P. Hennessy Issued: Sep. 30, 1980

A sanitary refuse device for collecting waste products such, for example, as the droppings of dogs, cats, and other animals. A hollow, cane-like, substantially vertical handle has a pistol-type grip at its upper end and a pair of normally open, spring-biased, pick-up jaws at its lower end, one of the jaws being fixedly connected to the lower end of the handle and the other jaw being pivotally mounted so as to swing to and from the fixed jaw. A trigger in associated relation with the piston-type grip is connected to the pivoted jaw through the medium of an actuating rod which passes through the handle and normally exists under compression in order to maintain the pivoted jaw in its open position against the action of the associated spring. Retraction of the trigger places the actuating rod under tension so that it becomes a pull rod and causes the pivoted jaw to swing towards the fixed jaw into a closed position. A latch arrangement is associated with the trigger and maintains the latter in its retracted position until released.

U.S. Pat. No. 4,555,132

Inventor: John Takoushian

Issued: Nov. 26, 1985

A portable pet toilet, comprising a receptacle member having a side wall element defining a top portion and a bottom mouth portion and a lid member and a bottom wall element that are pivotably mounted on the receptacle member at the top mouth portion and bottom mouth portion, respectively. The pet toilet comprises an elongated handle member, structure for actuating the lid member and bottom wall member, and a cover element removably disposed at the inside surface of the bottom wall element.

U.S. Pat. No. 4,958,871

Inventor: James W. Hemans

Issued: Sep. 25, 1990

An improved, hand-held device for the picking up of animal waste in a clean, hygienic manner using a scooping device (#26) and a fold-lock-top sandwich bag as the receptacle for the waste material is the embodiment of this invention. The large pocket (#14) of the fold-lock-top sandwich bag fits through a central opening in the scoop device while the small pocket (#22) of the same bag completely covers the scooping-type tapered blade (#28) so as to prevent any soiling of the scoop device (#26) by the waste material. This scoop device (#26) is attached to a locking telescopic handle with an adjustable belt clip (#8) so as to allow freedom of the hands while in transport. By using a fast forward motion, with the wrist, the animal waste is lifted slightly by the tapered blade (#28) and deposited in the large pocket (#14) of the very common, inexpensive fold-lock-top sandwich bag used as its receptacle. The bag is easily removed by lifting the flap (#18) of the fold-lock-top bag off the hook (#16) which is used to keep the bag open while in use. The scoop device (#26) itself never gets dirty.

U.S. Pat. No. 5,236,237

Inventor: Clair W. Shultz

Issued: Aug. 17, 1993

An open-ended container is carried on the end of a handle; and that connection is by a bail-wire, of a general U-shape, whose ends are rotatably mounted on the container side walls, the bail-wire's central or bight portion of the bail being rotatably connected to the handle,by a pivotal connection which is also slidable. These features and their details provide that an easy swinging effort by the dog's owner will cause the container to swing to a reception condition in which the handle's scooper member is on the far side of the feces, and the container is in a position with its open end facing the feces. Then, by a pull upwardly on the handle, the feces is pushed toward and into the container; and then, merely by the owner's continuousness of the upward pull of the handle, the container swings to its carrying or at-rest condition, with its open end up, and with the feces safely carried in the bottom of the container. It is an easy and quick one-hand movement by the owner, with no danger of soiling his hands or shoes.

U.S. Pat. No. 5,335,952

Inventor: Millard Clapper

Issued: Aug. 9, 1994

A device for retrieving and disposing of animal waste in a bag and method of use thereof wherein no parts of the device come into contact with the waste and the operator need not manipulate or otherwise touch the bag after it has contacted the waste. A clean bag is placed over a pair of spring-biased scoop members carried on the distal end of an elongated shaft. The scoop members and bag are placed in a hollow sleeve, open at both ends, where the scoop members are retained with terminal edges thereof in closely adjacent relation by the sleeve walls. As the bag and scoop members are advanced out of the lower end of the sleeve, the scoop members are moved to spaced relation by spring biasing, and the closed end of the bag is placed over the waste. Moving the lower end of the sleeve back over the scoop members turns the bag inside-out, and the waste-containing bag may then be discarded by again advancing the scoop members out of the sleeve.

U.S. Pat. No. 5,350,208

Inventor: Dante C. Heinrichson

Issued: Sep. 27, 1994

An animal waste pick up and disposal unit comprising a pair of opposed jaws each movable toward each other; a plastic bag removably disposed between the pair of jaws having material adjacent an open end thereof folded back over an outer surface of the pair of jaws; an arrangement disposed on the outer surface of each of the pair of jaws to releasably secure the material of the bag to the outer surface of the pair of jaws; an elongated handle; and another arrangement secured to each of the pair of jaws and the enable to bias the pair of jaws in an open position and to actuate each of the pair of jaws to enable picking up animal waste and depositing the same in the plastic bag for disposal at a later time.

U.S. Pat. No. 5,628,537

Inventor: Ralph F. Kiemer

Issued: May 13, 1997

A device for scooping up animal waste and sealing it in an ordinary plastic film bag has a long handle for one handed operation at a distance from the waste. At one end of the handle is a pair of openable and closable jaws. The closed end of the bag is secured to a releasable clip between the jaws. The open end of the bag is everted over the free edges of the jaws. The open jaws with the open bag stretched between is then placed over the waste and the jaws closed, thus scooping the waste into the bag. The edges of the bag are then removed from the jaws and sealed with a tie. A locking mechanism keeps the jaws closed until ready to dispose of the sealed bag. The opening and closing and locking of the jaws may be performed with one hand by an operator mechanism located away from the jaws.

U.S. Pat. No. 6,305,322

Inventor: Tony Patel

Issued: Oct. 23, 2001

The invention discloses a device for picking up animal waste. The device is an elongated outer tubular handle having an interior manipulator therein. At end of the outer handle there is located a hollow tubular casing. At an outer end of the inner manipulator is located a handle and at the other end there is separably located a claw or a cross made of stiff but flexible material. The claw has four arms. The circumference of the claw is substantially larger than an inner diameter of the hollow tubular casing. Thereby, when the claw is pulled inwardly of the hollow tubular casing, the claws will collapse within the hollow tubular casing. Thereby, any animal waste can be picked up and deposited in a convenient location. Before picking up the waste, a piece of paper or bag is placed within the claw. This results in that no waste is exposed to any elements of the pick-up device including the arms of the claw.

While these pet feces receptacle devices may be suitable for the purposes for which they were designed, they would not be as suitable for the purposes of the present invention, as hereinafter described.

SUMMARY OF THE PRESENT INVENTION

The present invention discloses a disposable pet waste receptacle which uses a selectively telescoping handle having a pivotal ring with a disposable bag fastened therearound whereby the bag can be placed under the anus of an animal during defecation which relieves the owner from having to pickup the fecal material after the fact. The telescoping handle is preferably no more than 16" in length when fully retracted and does not exceed 36" in length when fully extended. The pivotal ring includes a double lip providing support of the disposable receptacle. The disposable receptacle contains an elastic band that is nestled between the upper and lower lips of the ring. A tie string is woven within the elastic band to enable the user to close the receptacle upon disposal. The handle is attached to the double lip rim with a pivoting joint means with a self-locking mechanism such as a tension screw means which allows the user to project the handle in a desired angle. A quick-connect attachment may also be provided thereby allowing the user to easily remove the double lip rim from the handle in one easy motion.

A primary object of the present invention is to provide means for disposal of pet feces using a disposable receptacle.

Another object of the present invention is to provide means for disposal of pet feces using a selectively telescoping handle.

Yet another object of the present invention is to provide means for a selectively telescoping handle having a pivotal ring.

Still yet another object of the present invention is provide means for a pivotal ring having a double lip to support a receptacle.

Another object of the present invention is to provide means for securing the receptacle prior to disposal.

Yet another object of the present invention is to provide means for the receptacle to be of various shapes and sizes.

Still yet another object of the present invention is to provide means to comply with city and state ordinances.

Yet another object of the present invention is to provide means for a disposable receptacle having a quick-connect feature for removal of the double lip rim from the handle.

Another object of the present invention is to provide means for a disposable receptacle that is simple and easy to use.

Yet another object of the present invention is to provide means for a disposable receptacle that is economical to manufacture.

Additional objects of the present invention will appear as the description proceeds.

The present invention overcomes the shortcomings of the prior art by providing a disposable pet waste receptacle that contains a removable telescoping member and a detachable containment member.

The foregoing and other objects and advantages will appear from the description to follow. In the description, reference is made to the accompanying drawings, which form a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

DESCRIPTION OF THE DRAWINGS

In order that the invention may be more fully understood, it will now be described, by way of example, with reference to the accompanying drawings in which.

LIST OF REFERENCE NUMERALS

With regard to reference numerals used, the following numbering is used throughout the drawings.
10 present invention
12 user
14 telescoping handle
16 animal
18 base assembly
20 ring
22 disposable receptacle
24 pivoting joint means
26 tension spring means
28 female flange of ring
30 male base plate
31 flange of male base plate
32 flange of handle
34 thumbscrew
36 spring
38 washer
40 nut
42 friction plate face
44 friction plate face
46 handle base
48 upper lip
50 lower lip
51 recess
52 elastic band
54 tie string
56 heart shaped ring

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments since practitioners skilled in the art will recognize numerous other embodiments as well. For a definition of the complete scope of the invention, the reader is directed to the appended claims.

Figure 1:
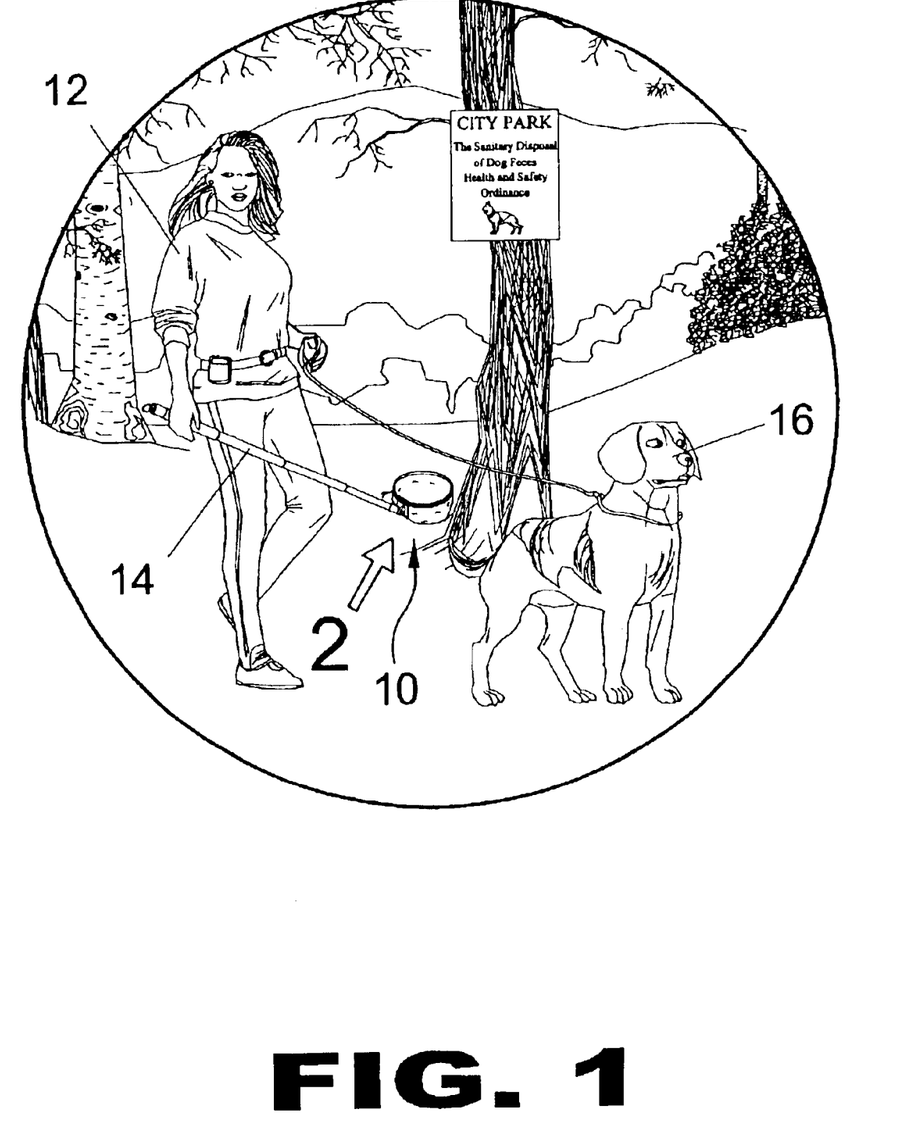
FIG. 1 is an illustrative view of the present invention in use.

Turning to FIG. 1, shown therein is an illustrative view of the present invention 10 in use. The present invention 10 is a disposable pet waste receptacle that provides means for dog owners or users 12 to capture pet feces using a selectively telescoping handle 14 having a pivotal ring with a disposable bag fastened therearound whereby the bag can be placed under the anus of the animal 16 during defecation which relieves the owner 12 from having to pickup the fecal material after the fact.

Figure 2:
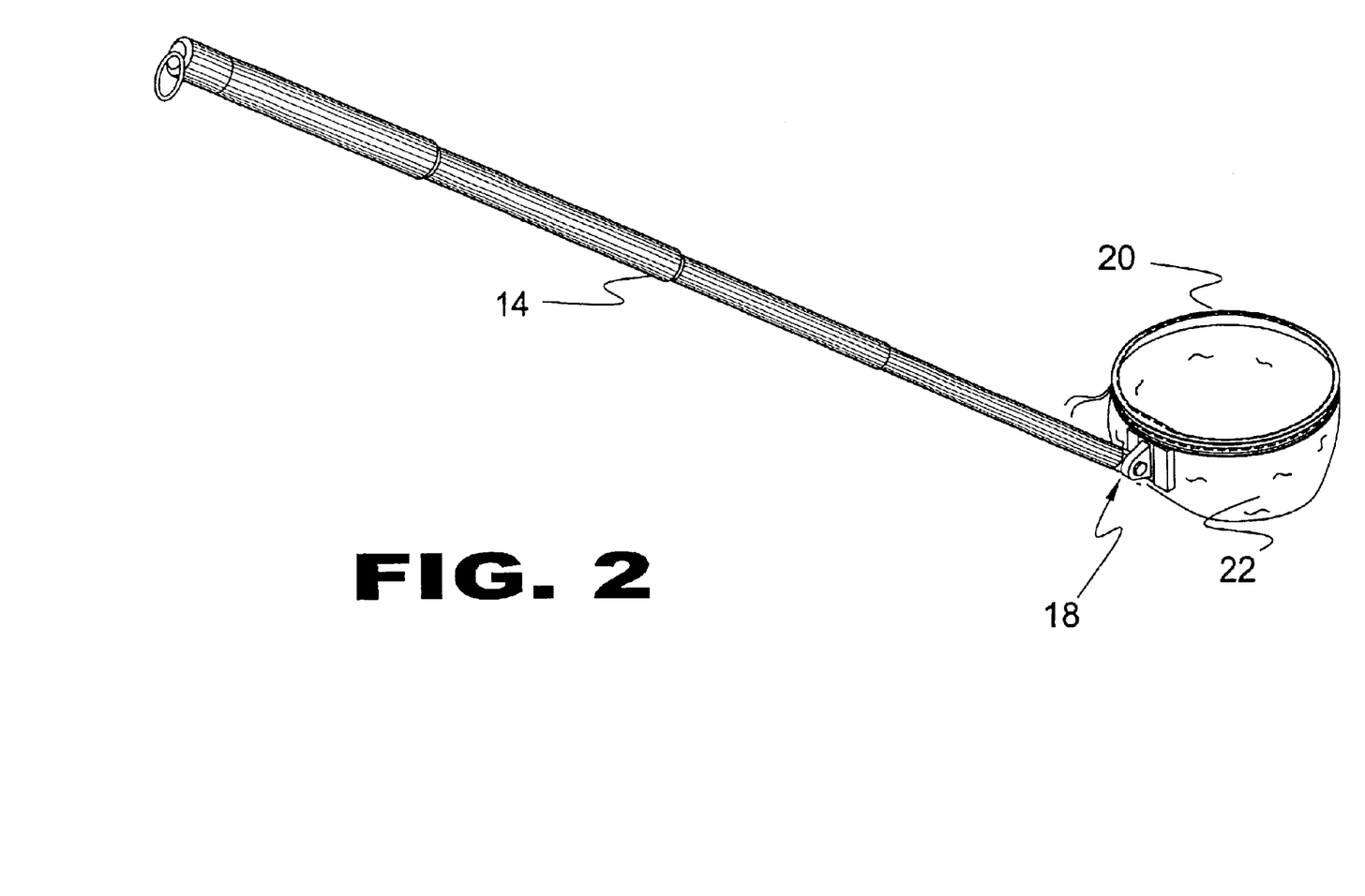
FIG. 2 is an isometric view of the present invention with handle extended.

Turning to FIG. 2, shown therein is an isometric view of the present invention 10 with handle 14 extended. The present invention 10 has four main components being a telescoping handle 14, a base assembly 18, a double lip ring 20, and a disposable bag receptacle 22. When the handle is extended, the user is enabled to scoop and reach the feces without bending or stretching.

Figure 3:
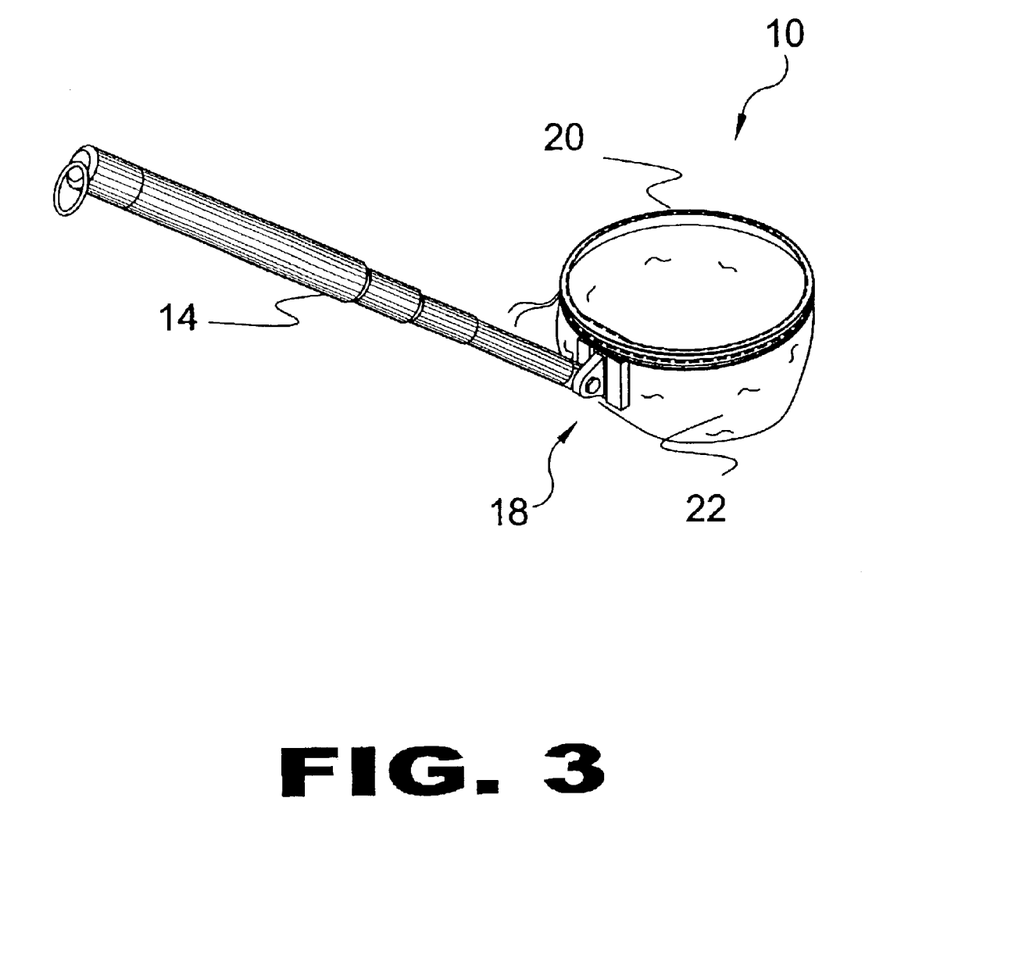
FIG. 3 is an isometric view of the present invention with handle retracted.

Turning to FIG. 3, shown therein is an isometric view of the present invention 10 with handle 14 retracted. When the handle 14 is retracted, the catcher 10 is convenient to carry or store. Also shown are the double lip ring 20, base assembly 18, and disposable bag 22.

Figure 4:
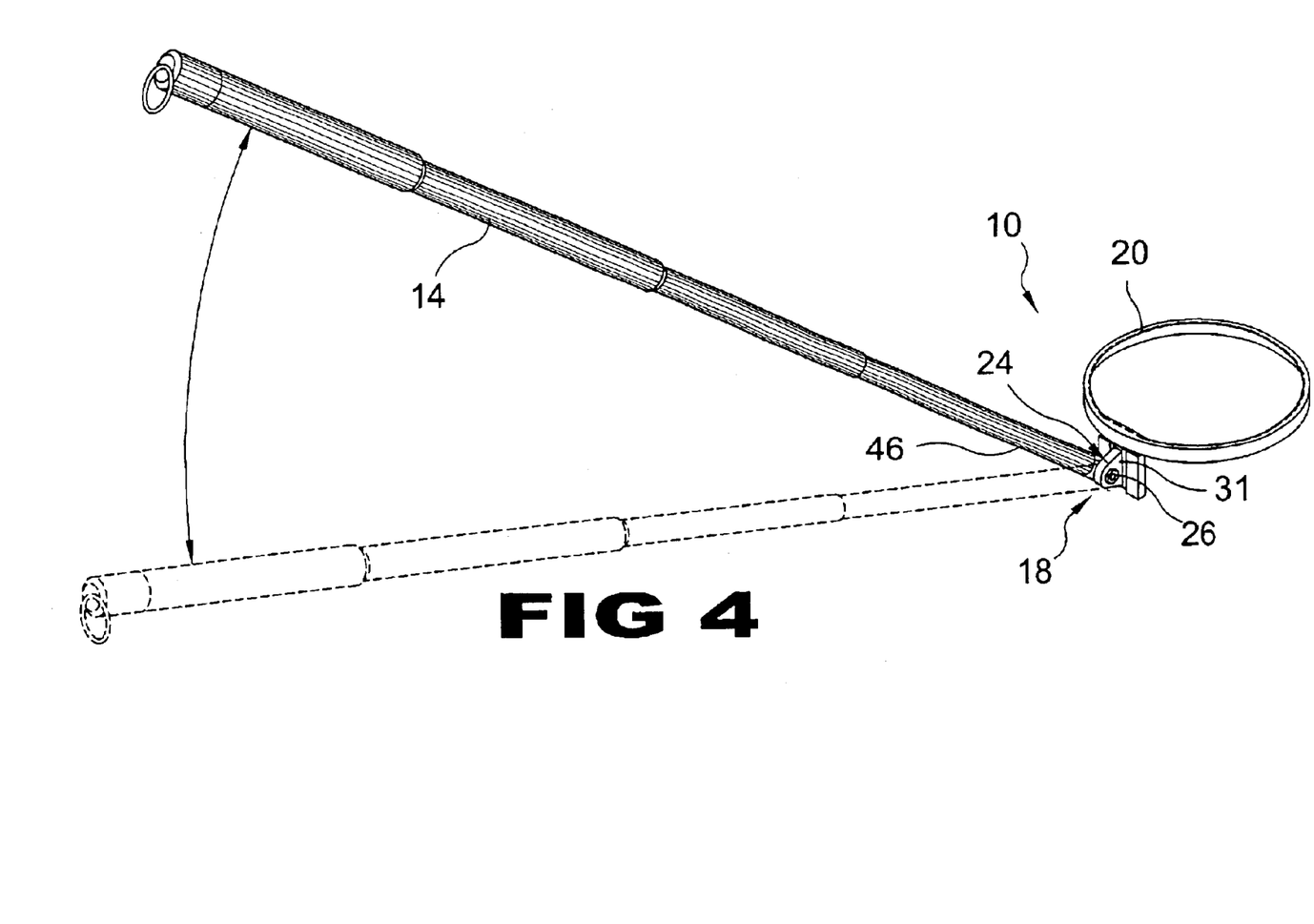
FIG. 4 is an isometric view of the present invention with handle extended.

Turning to FIG. 4, shown therein is an isometric view of the present invention 10 with handle 14 extended. A pivoting joint attachment means 24 secures the handle 14 to the base assembly 18 allowing the user to adjust the angle of the double lip ring 20 by applying pressure until it is in the desired position at which point the pivoting joint 24 locks into position until another bias strong enough to overcome the locking action thereof is applied. Also shown is a pivoting joint locking means utilizing a tension spring means 26 that applies a clamping action upon mating attachment flanges on the handle base 46 on the distal end of the telescoping handle 14 and the flange 31 until a stronger bias is applied thereto in order to reposition the angle of the double lip ring 20 as desired by the user.

Figure 5:
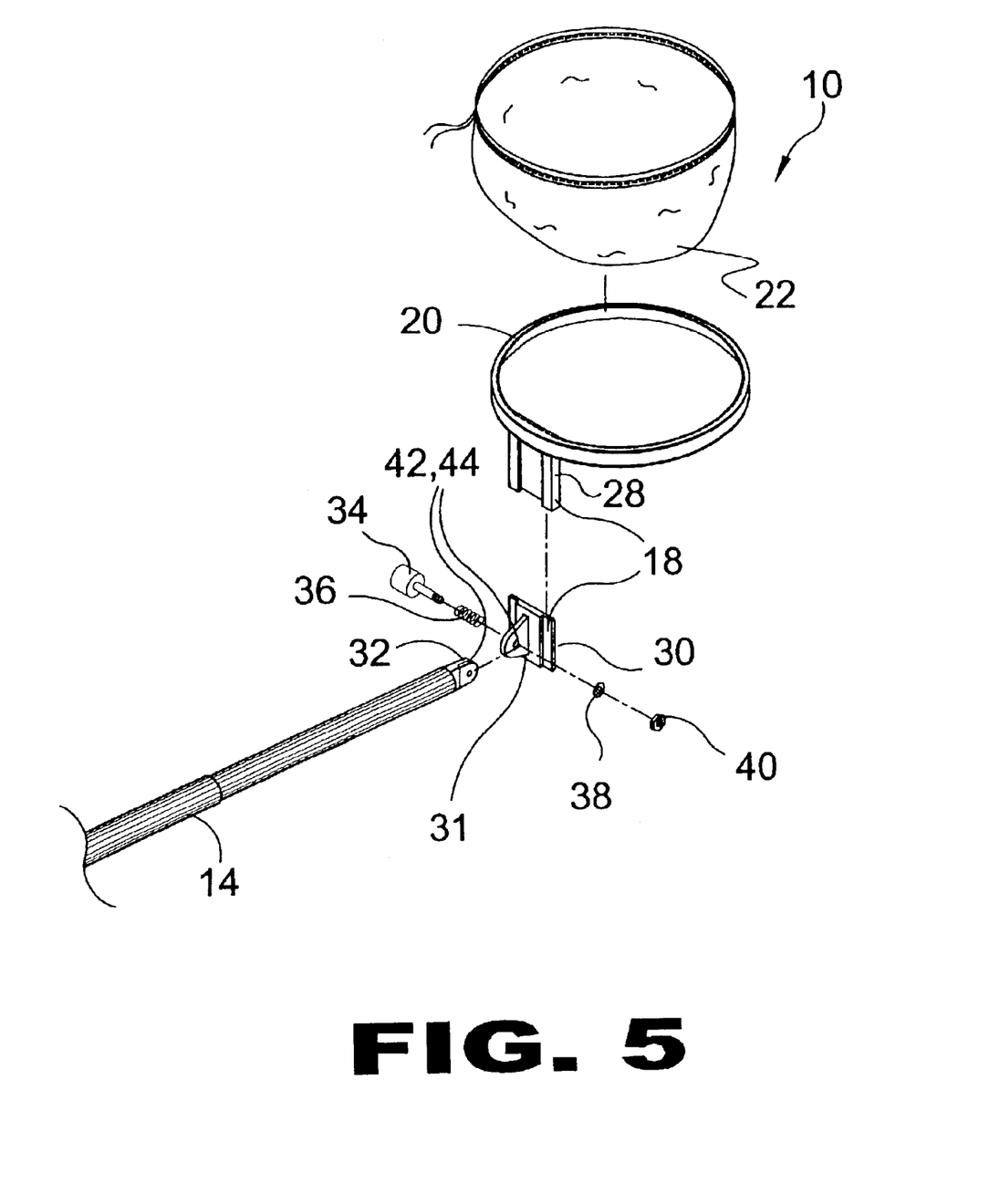
FIG. 5 is an exploded isometric view of the present invention.

Turning to FIG. 5, shown therein is an exploded isometric view of the present invention 10. The base assembly 18 comprises a male base plate 30 that is secured to the downwardly extending female flange 28 of the double lip ring 20 by means of male and female slip-on channels. This male/female channel quick connection feature allows ease of cleaning and/or ring replacement. To secure the handle 14 to the base plate 30 the flange 32 of the handle 14 is placed face-to-face with the flange 31 on the base plate 30 so the respective recesses are aligned with one another and then the shaft of the thumbscrew 34 is inserted through a high tension spring 36 and through the aforementioned recesses where it is secured thereon by a lock washer 38 and lock nut 40. The tension spring 36 applies a bias towards the locking nut 40 thus resulting in a clamping effect in regard to the two flange elements 31, 32 to prevent the inadvertent axial rotation thereof. Flange 31 is perpendicular to base plate 30. To further enhance the locking properties of mating faces of the flange elements the friction plate faces 42, 44 may be comprised of a non-skid material such as rubber or the surfaces thereof may be textured. Also shown is the disposable bag 22.

Figure 6:
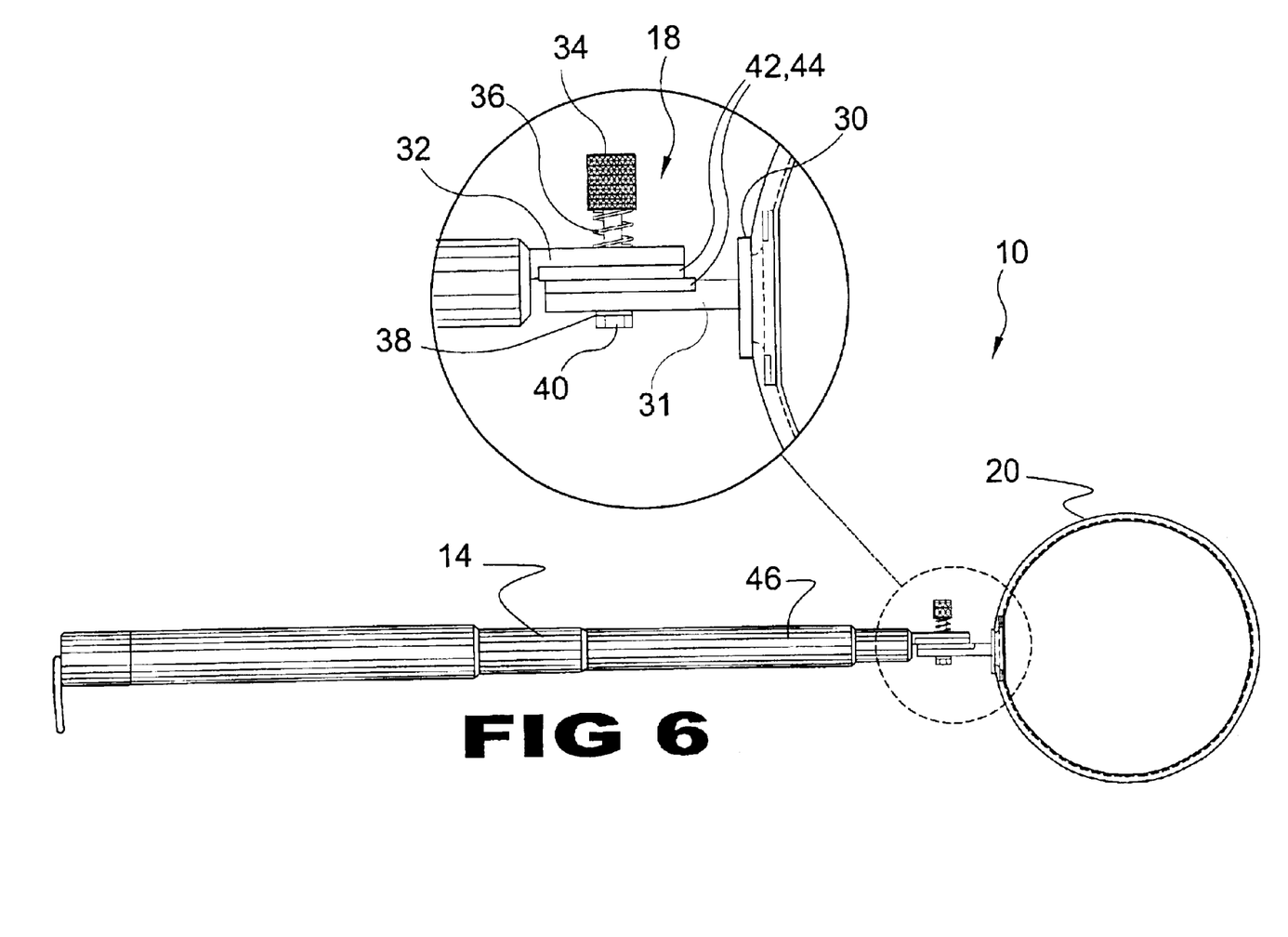
FIG. 6 is a top view of the present invention with handle retracted.

Turning to FIG. 6, shown therein is a top view of the present invention 10 with handle 14 and handle base 46 retracted showing the base assembly 18. The present invention 10 is composed of a rigid plastic making the assembly durable, but light in weight. This makes the disposable pet waste remover ease to carry and sturdy to allow removal of pet droppings. Other previously disclosed elements are also shown.

Figure 7:
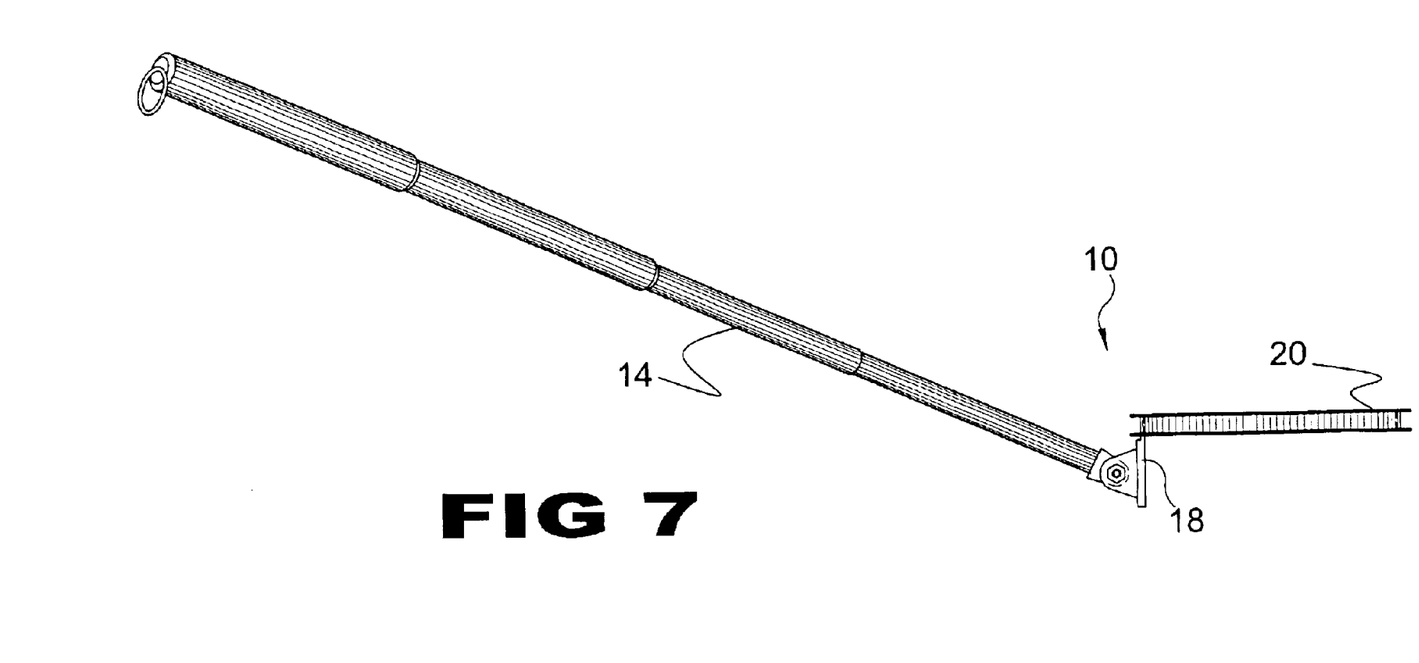
FIG. 7 is a side view of the present invention with handle extended.

Turning to FIG. 7, shown therein is a side view of the present invention 10 with handle 14 retracted. The thin profile of the double lip ring 20 provides the user the ability to reach into tight areas that may be entangled with branches or tall grass. Also shown is base assembly 18 of the ring 20.

Figure 8:
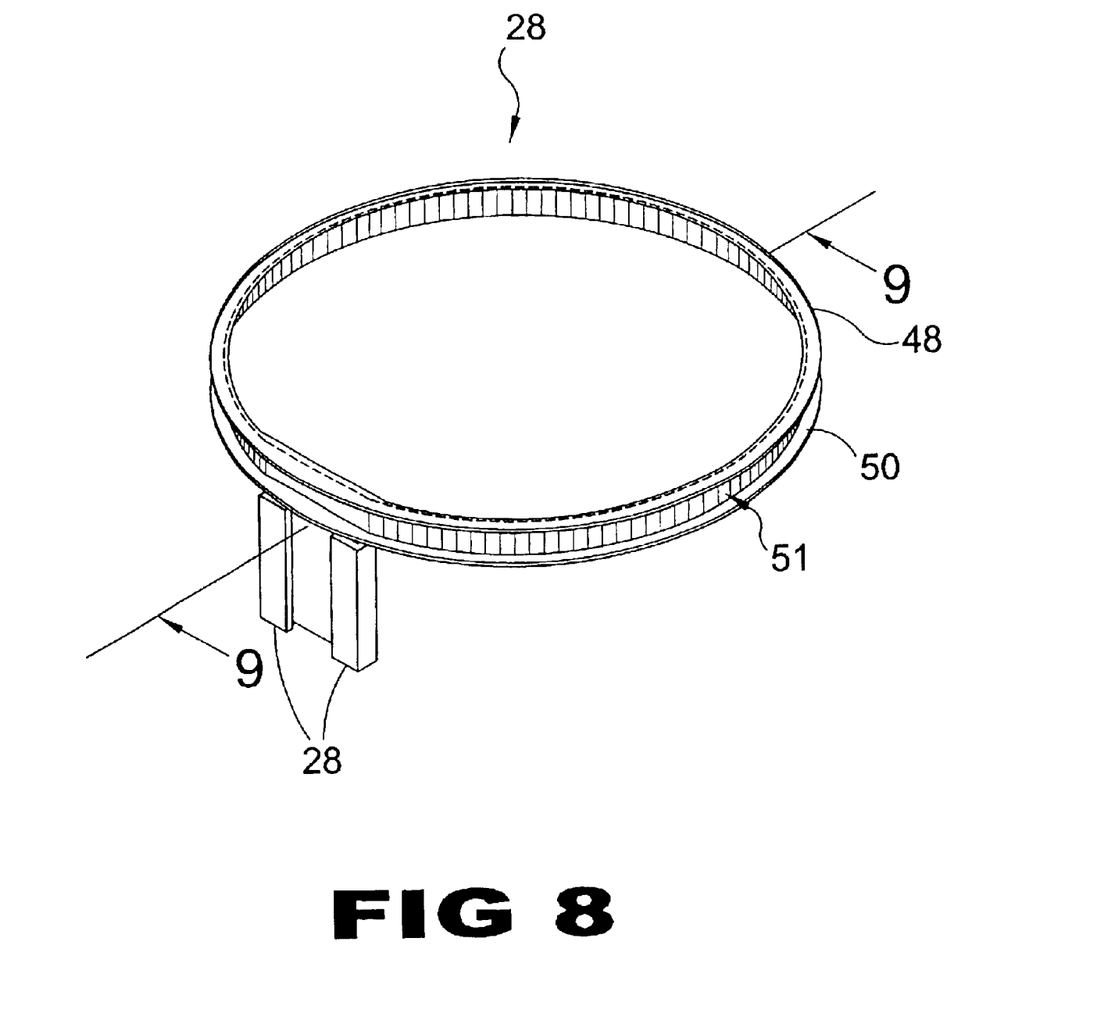
FIG. 8 is an isometric view of the present invention double lip ring.

Turning to FIG. 8, shown therein is an isometric view of the present invention double lip ring 20. The double lip ring 20 provides support for the disposable receptacle. The disposable receptacle contains an elastic band that is nestled in recess 51 formed between the upper 48 and lower 50 lips of the ring 20. Also shown is the female flange 28 of the ring 20 showing the slip-on channel therein.

Figure 9:
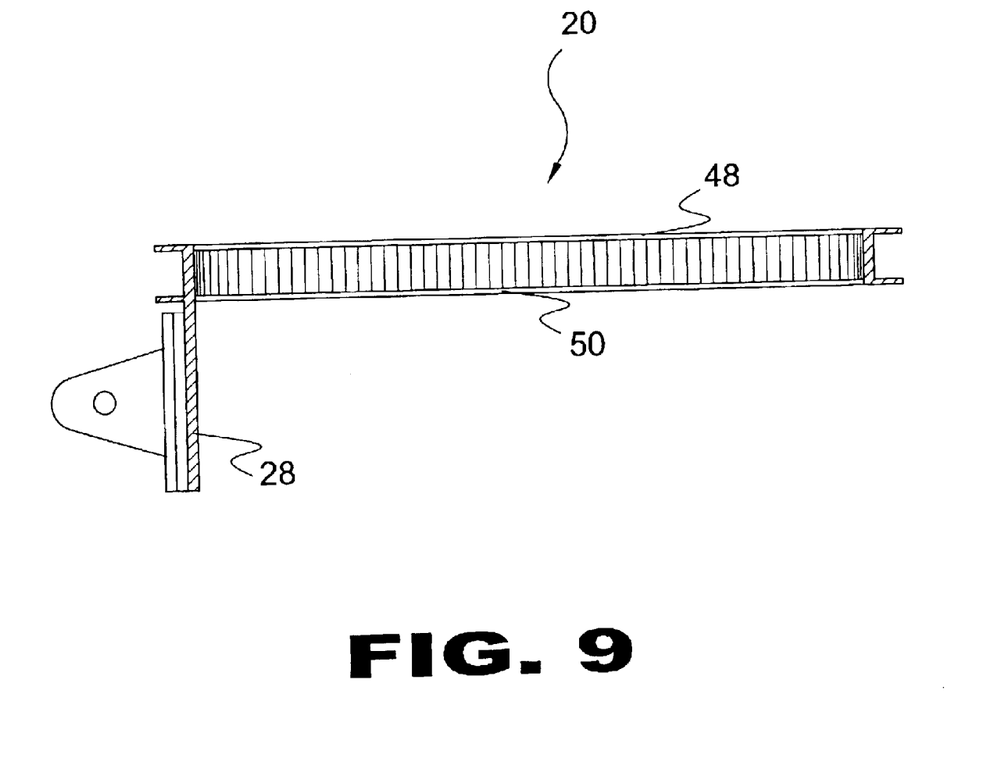
FIG. 9 is a sectional view of the present invention double lip rind.

Turning to FIG. 9, shown therein is a sectional view of the present invention double lip ring 20. Depicted in FIG. 9 is a cross section from FIG 8. The upper 44 and lower 50 lips create a cavity that secures the disposable receptacle. A female flange 28 extends downward from ring 20 to provide means to secure the base plate as previously disclosed.

Figure 10:
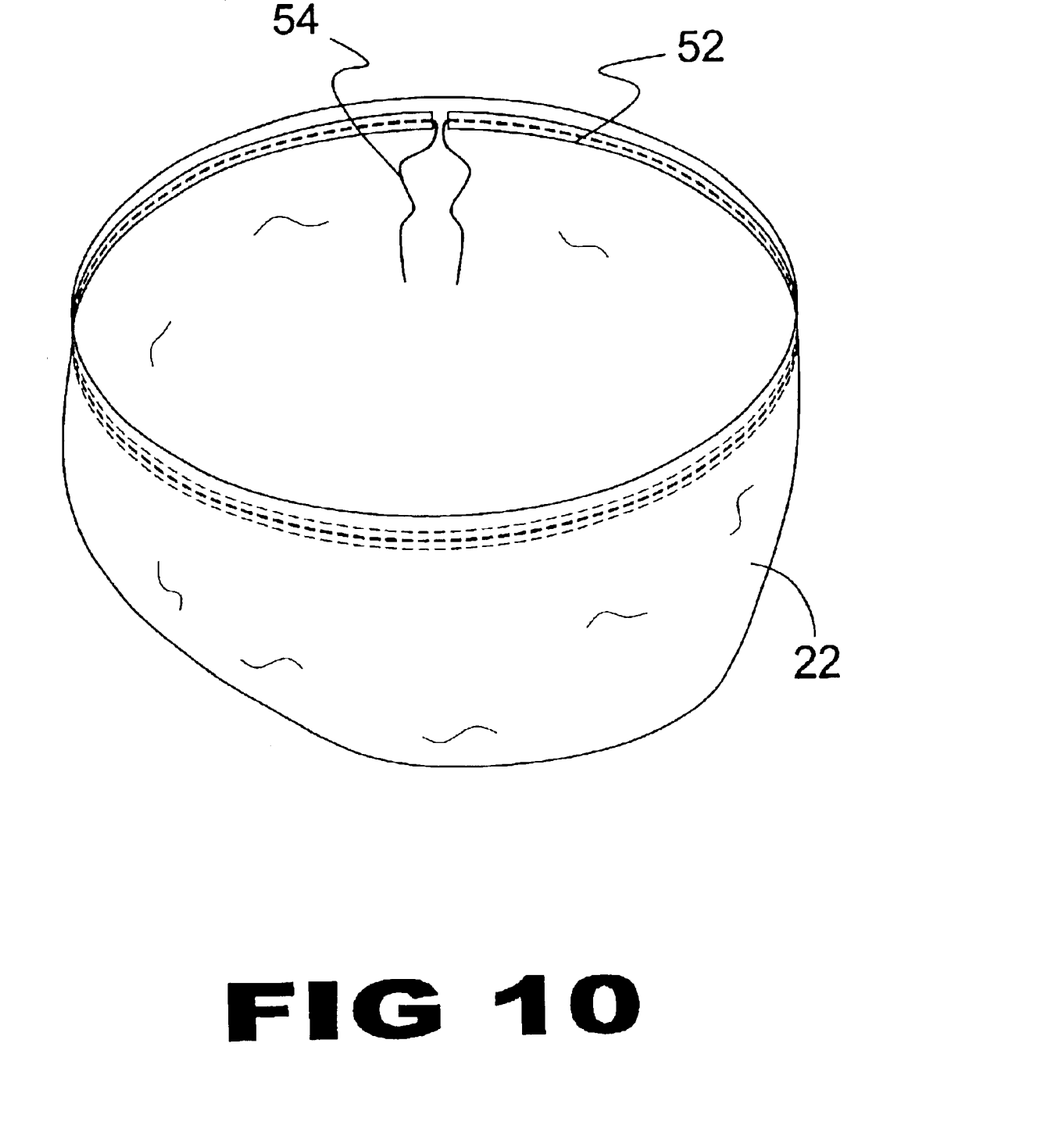
FIG. 10 is an isometric view of the present invention disposable receptacle.

Turning to FIG. 10, shown therein is an isometric view of the present invention disposable receptacle 22. The disposable receptacle 22 contains an elastic band 52 around the opening that allows the receptacle 22 to be placed securely upon, around and between lips 48, 50 of the double lip ring. A tie string 54 is woven within the elastic band 52 to enable the user to close the receptacle upon disposal.

Figure 11:
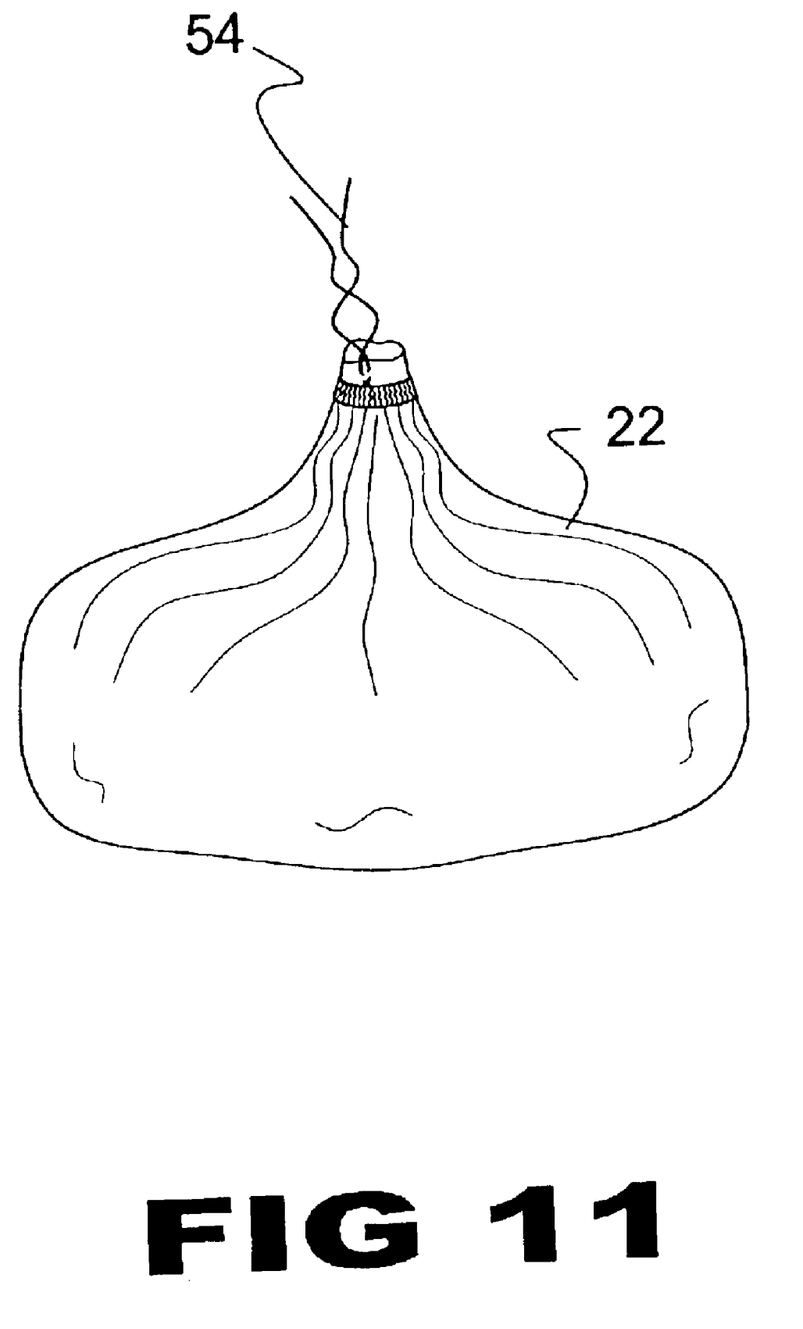
FIG. 11 is an illustrative view of the present invention disposable receptacle.

Turning to FIG. 11, shown therein is an illustrative view of the present invention disposable receptacle 22. Once the canine waste is scooped the disposable receptacle 22 is easily removed and sealed by pulling the tie string 54. The secure receptacle 22 is then disposed of.

Figure 12:
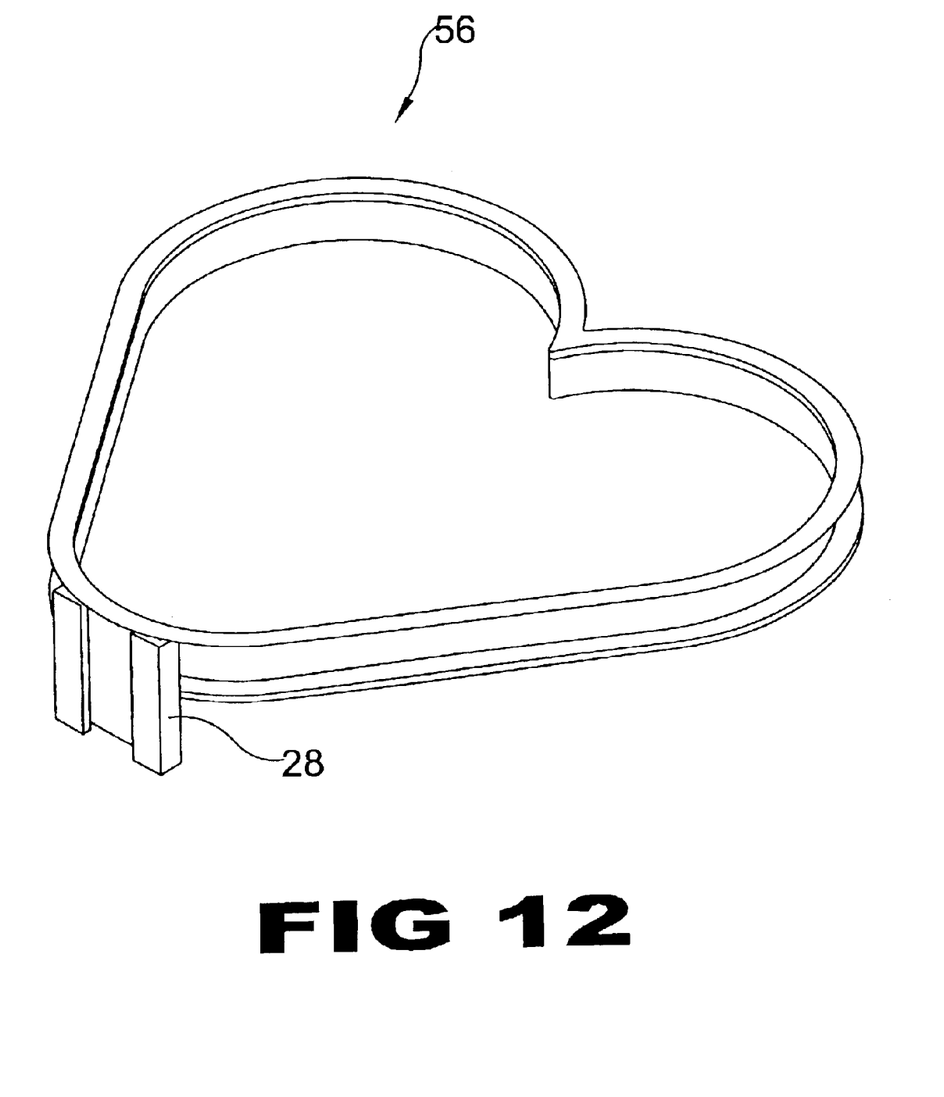
FIG. 12 is an isometric view of an alternate shape of the double lip ring.

Turning to FIG. 12, shown therein is an isometric view of an alternative embodiment of the double lip ring of the present invention. The double lip ring may be of various shapes and sizes such a heart-shaped ring 56. The quick connect fitting of the ring 56 provided the user of interchanging the rings to suit user preference and for cleaning purposes. Also shown is female flange 28 of the ring 56 showing the slip-on channel of the quick connect fitting.

I claim:

1. An apparatus for a disposable pet waste receptacle, comprising:
   a) a handle for holding the waste receptacle, said handle having a first end and a second end, said first end for being held by a user and said second end for connection to the waste receptacle;
   b) a waste receptacle disposed on said second end of said handle for receiving waste from an animal; and, means for connecting said handle to said waste receptacle whereby the handle is removably fixed to the receptacle and the angle between the handle and the receptacle can be varied, wherein said handle is a telescoping handle telescoping in length from about 16 inches to about 36 inches, and said waste receptacle comprises a disposable bag and a double lip ring, said double lip ring having an upper side, a lower side, first upper lip and a second lower lip extending radially therefrom to form a recess therein, said recess being disposed between said upper and lower lips to permit the disposable bag to be secured therein, wherein said disposable bag comprises elastic material being disposed around the opening of said bag to permit the elastic to secure the bag to the double lip ring and a tie string being disposed around the opening of said bag to permit the tie string to secure the bag to the double lip ring, said tie string and said elastic material being disposed in said recess of said double lip ring to permit the bag to be removably secured to the ring and said double lip ring is shaped like a heart to provide a decorative ring, wherein said means for connecting said handle to said waste receptacle comprises:
   a) a downwardly extending flange disposed on said lower side of said ring;
   b) a base plate being removably attached to said downwardly extending flange; and,
   c) a pivoting joint connecting said second end of said handle to said base plate to permit the angle between the handle and the ring to he varied.

2. The apparatus of claim 1, wherein said downwardly extending flange comprises a female channel member and said base plate forms a male channel member, wherein said base plate is slidably insertable into said downwardly extending flange to permit quick connection between the downwardly extending flange and the base plate.

3. The apparatus of claim 2, wherein said pivoting joint comprises a first flange being disposed on said base plate and a second flange disposed on said second end of said handle, said first flange being perpendicular to said base plate, wherein said first flange mates with said second flange, further comprising a tension spring means for joining said first and second flanges together whereby the first and second flange pivot with respect to each other.

4. The apparatus of claim 3, wherein the surface of said first and second flange is textured to permit the flanges to better connect to each other.

5. The apparatus of claim 4, wherein the surface of said first and second flange is made of rubber to permit the flanges to better connect to each other.

6. The apparatus of claim 5, wherein said tension spring means comprises:
   a) wherein said first and second flanges have a mating pair of apertures therein, wherein said apertures are disposed perpendicular to said first and second flange to permit the insertion of a thumbscrew therein;
   b) a thumbscrew inserted into and through said mating pair of apertures on said first and second flanges, said thumbscrew having a head on a first end and threads on a second end;
   c) a tension spring disposed on said thumbscrew between said first end of said thumbscrew and either said first or second flange; and,
   d) a lock washer and lock nut removably disposed on said second end of said thumbscrew to permit the tension on the first and second flanges to be varied.

* * * * *